(12) United States Patent
Balsells Mercadé

(10) Patent No.: US 9,731,902 B2
(45) Date of Patent: Aug. 15, 2017

(54) FLEXIBLE RETICULAR STRUCTURE

(71) Applicant: MANUFACTURAS Y TRANSFORMADOS AB, S.L., Igualada (Barcelona) (ES)

(72) Inventor: Antoni Balsells Mercadé, Igualada (ES)

(73) Assignee: MANUFACTURAS Y TRANSFORMADOS AB, S.L., Igualada (Barcelona) (ES)

( * ) Notice: Subject to any disclaimer, the term of this patent is extended or adjusted under 35 U.S.C. 154(b) by 0 days.

(21) Appl. No.: 15/185,394

(22) Filed: Jun. 17, 2016

(65) Prior Publication Data
US 2016/0368713 A1 Dec. 22, 2016

(30) Foreign Application Priority Data
Jun. 19, 2015 (ES) .................. 201530872

(51) Int. Cl.
| | | |
|---|---|---|
| *B65G 17/08* | (2006.01) | |
| *B65G 27/10* | (2006.01) | |
| *B26D 7/20* | (2006.01) | |
| *B65G 17/34* | (2006.01) | |

(52) U.S. Cl.
CPC ............ *B65G 27/10* (2013.01); *B26D 7/20* (2013.01); *B65G 17/08* (2013.01); *B65G 17/34* (2013.01)

(58) Field of Classification Search
CPC .............................. B65G 17/08; B65G 17/083
USPC .................................................. 198/851, 853
See application file for complete search history.

(56) References Cited

U.S. PATENT DOCUMENTS

| | | | |
|---|---|---|---|
| 4,328,726 A | | 5/1982 | Pearl |
| 4,685,363 A | | 8/1987 | Gerber |
| 4,925,016 A | | 5/1990 | Lapeyre |
| 5,189,936 A | * | 3/1993 | Gerber .................. B26D 7/018 |
| | | | 198/851 |
| 5,305,869 A | * | 4/1994 | Damkjaer ............. B65G 17/08 |
| | | | 198/689.1 |

(Continued)

FOREIGN PATENT DOCUMENTS

| | | |
|---|---|---|
| EP | 0175483 A1 | 3/1986 |
| EP | 2656987 A1 | 10/2013 |

(Continued)

OTHER PUBLICATIONS

Spanish Search Report issued in Application No. P201530872 dated May 27, 2016.
Extended European Search Report issued in European Pat. Appl. No. 16382283.6-1707 dated Nov. 8, 2016.

*Primary Examiner* — Mark A Deuble
(74) *Attorney, Agent, or Firm* — Marshall, Gerstein & Borun LLP

(57) ABSTRACT

The present invention relates to a flexible reticular structure which comprises a movable surface the movement of which is operated by operating means, and is characterized in that said surface is formed by a plurality of modules linked to one another. Said modules forming the surface are preferably linked to one another by means of attachment rods, each of said rods being housed in holes provided in at least two of said modules.
The present invention prevents the need to disassemble and replace the entire movable surface, rather only the affected module or modules, for repair or maintenance.

8 Claims, 5 Drawing Sheets

(56) References Cited

U.S. PATENT DOCUMENTS

| | | | | |
|---|---|---|---|---|
| 5,439,097 A | * | 8/1995 | Takahashi | B65G 17/08 198/690.2 |
| 5,497,874 A | * | 3/1996 | Layne | B65G 17/08 198/377.01 |
| 5,730,431 A | | 3/1998 | Cattini | |
| 6,148,990 A | * | 11/2000 | Lapeyre | B65G 17/08 198/779 |
| 6,189,686 B1 | * | 2/2001 | Shibayama | B65G 17/08 198/493 |
| 6,308,825 B1 | * | 10/2001 | Nakamura | B65G 17/08 198/853 |
| 6,662,545 B1 | * | 12/2003 | Yoshida | B65G 17/065 198/851 |
| 2003/0019342 A1 | | 1/2003 | Zanesi | |
| 2004/0065530 A1 | * | 4/2004 | Shibayama | B65G 17/086 198/853 |
| 2004/0238329 A1 | * | 12/2004 | Verdigets | B65G 17/08 198/698 |
| 2006/0185967 A1 | * | 8/2006 | Sedlacek | B01D 33/04 198/853 |
| 2012/0061209 A1 | * | 3/2012 | Memoli | B65G 17/40 198/699.1 |
| 2013/0319830 A1 | * | 12/2013 | Ota | B65G 15/32 198/853 |

FOREIGN PATENT DOCUMENTS

| | | |
|---|---|---|
| ES | 2074747 T3 | 9/1995 |
| ES | 2426110 A2 | 10/2013 |
| WO | WO-2012128621 A1 | 9/2012 |

* cited by examiner

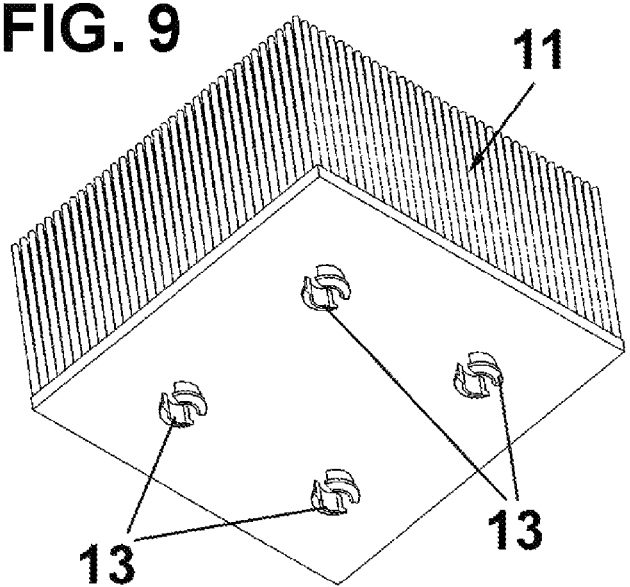
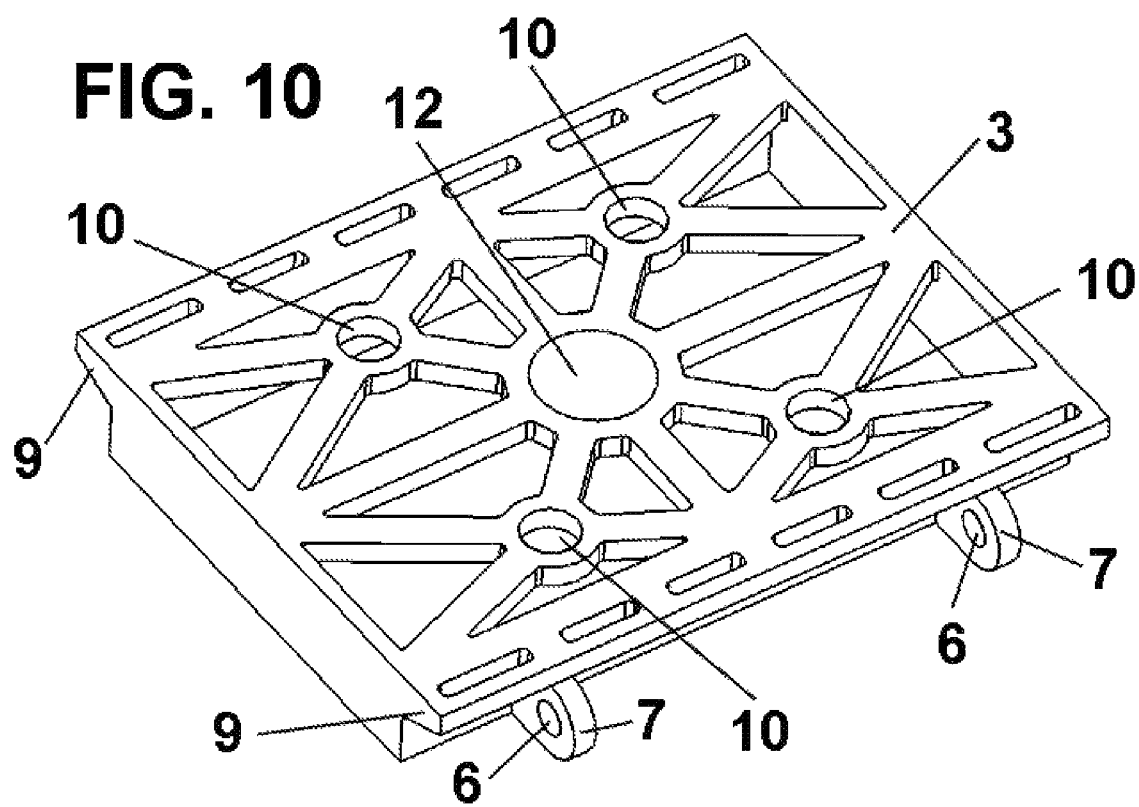

FLEXIBLE RETICULAR STRUCTURE

CROSS-REFERENCE TO RELATED APPLICATIONS

This application claims priority under 35 U.S.C. §119 to prior-filed Spanish patent application P201530872, filed Jun. 19, 2015, the entire content of which is hereby incorporated herein by reference, for all purposes and in its entirety.

TECHNOLOGICAL FIELD

The present invention relates to a flexible reticular structure, particularly a modular flexible reticular structure on which additional elements can be assembled.

BACKGROUND

Flexible reticular structures are used in different applications and comprise a movable surface for conveying goods.

A type of flexible reticular structures are used, for example, to move sheet material for the cutting thereof by means of a head, said sheet material being able to be a piece of paper or fabric. In this case, a base element is placed on the movable surface to allow cutting said sheet material.

A problem associated with conventional conveyance systems is that in the case of repair or maintenance, the entire or most of the movable surface must be removed or replaced, with the subsequent associated economic cost.

Furthermore, in conventional conveyance systems the movement of said movable surface is operated by means of a pair of motors, one for each direction of movement.

Therefore, there is an obvious need for a flexible reticular structure in which repair and maintenance operations can be performed in an easier and quicker, and therefore more economical, manner.

Another additional objective of the flexible reticular structure according to the present invention is to provide simpler operating means which do not require two different motors, one for each direction of movement.

SUMMARY

The flexible reticular structure of the invention successfully solves the mentioned drawbacks, having other advantages that will be described below.

The flexible reticular structure according to the present invention comprises a movable surface the movement of which is operated by operating means, and is characterized in that said surface is formed by a plurality of modules linked to one another.

According to a preferred embodiment, said modules forming the surface are linked to one another by means of attachment rods, each of said rods being housed in holes provided in at least two of said modules.

The modules preferably comprise flanges where the holes housing said rods are arranged.

According to a preferred embodiment, said modules are of two different types, i.e., larger modules and smaller modules, which are advantageously arranged longitudinally and transversely in an alternating manner.

The upper surface of said modules can be perforated, forming a reticular, through which a vacuum, pressure or fluids are transmitted from the lower cavity outwards (for applications requiring same).

To facilitate assembly, the width of said larger modules is substantially equal to the width of said smaller modules, and to facilitate transport before assembly, the larger modules comprise in their lower part a cavity which can house a smaller module.

Advantageously, said larger modules comprise side projections for covering said attachment rods. Said holes for attachment can be distributed regularly or irregularly.

Advantageously, said (larger and smaller) modules comprise holes on their surface for the fixing of respective additional elements in the upper part of the flexible reticular structure. Said additional elements allow adapting the surface according to different applications. Said fixing holes for the fixing of respective additional elements can be distributed regularly or irregularly.

According to a preferred embodiment, said additional elements are brushes provided with bristles which are used as a support of a sheet material for the cutting thereof, and in this case said modules comprise a projection for opening the bristles of said brushes. Said upper projections are distributed according to the distribution of the fixing holes. It is obvious for a person skilled in the art that said additional elements can be any element, in addition to bristle brushes, which can facilitate conveyance of the material to be handled according to the application.

Advantageously, the design of the modules allows moving the entire structure backward and forward with a single operating element, locking the parts preventing them from lifting up. Said operating means comprise a single motor for moving said surface in both directions, although conventional dual-motor system can also be used.

Advantageously, said operating means (motors or equivalents) can operate along the width of the entire structure using several drive means (pinions, gears or equivalents), better distributing forces on the flexible reticular structure and not only on the sides.

The design of the flexible reticular structure according to the present invention allows operating the motor in both directions, such that when inverting the direction of rotation of the motor with respect to its position on the workbench, said flexible reticular structure becomes stiff, thereby preventing it from folding up.

Furthermore, this design allows applying a vertical force against the workbench when operated horizontally by the motor.

The flexible reticular structure according to the present invention has at least the following advantages:
  it is modular such that it is not necessary to disassemble or replace the entire movable surface, rather only the affected module or modules, for repair or maintenance;
  the additional elements forming the specific surface for each application can be coupled in the upper part and can be disassembled individually, allowing very simple and efficient maintenance since it is not necessary to disassemble them entirely for this purpose;
  it facilitates transporting the movable surface before assembling the flexible reticular structure since the smaller modules can be arranged inside the larger modules;
  it simplifies the operating means since said surface can be moved in both directions with a single motor.

BRIEF DESCRIPTION OF THE DRAWINGS

To better understand what has been set forth above, several drawings schematically depicting only by way of non-limiting example a practical embodiment are attached.

FIG. 9 is a bottom perspective view showing an additional element, a bristle brush in this preferred embodiment, showing the anchoring clips for assembling them in the fixing holes of the flexible reticular structure.

FIG. 10 depicts a module, such as that depicted in FIG. 3, with a perforated upper surface forming a reticulate for transmitting a vacuum or any fluid between the lower cavity and the outside.

DETAILED DESCRIPTION

Figure 1:
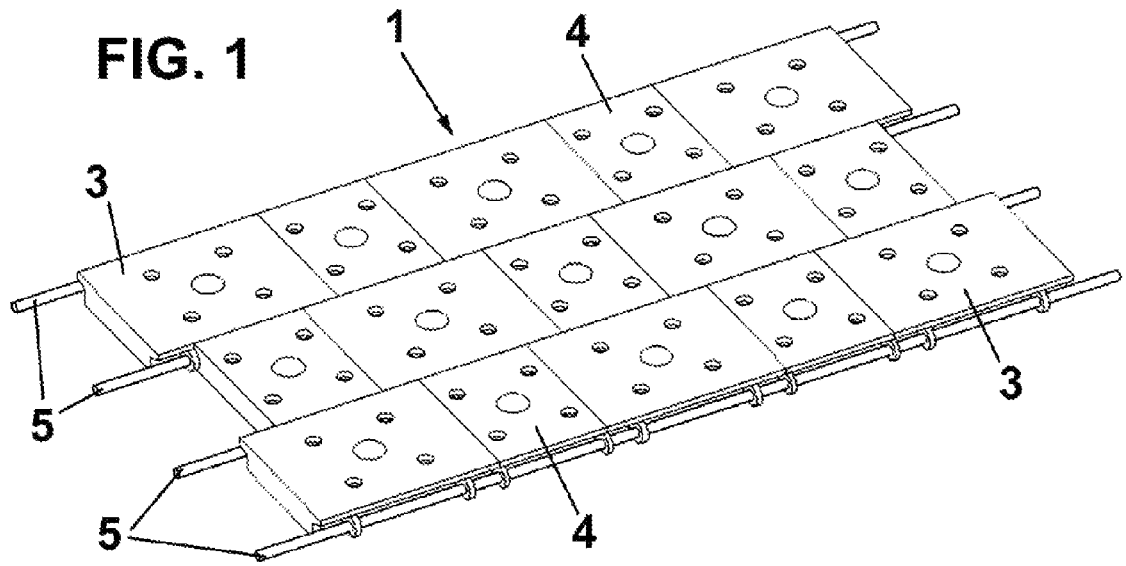
FIG. 1 is a perspective view of the upper part of a portion of a flexible reticular structure according to the present invention.

FIG. 1 depicts the perspective view of the movable surface, indicated in general by means of reference number 1, of the flexible reticular structure according to the present invention.

Figure 7:
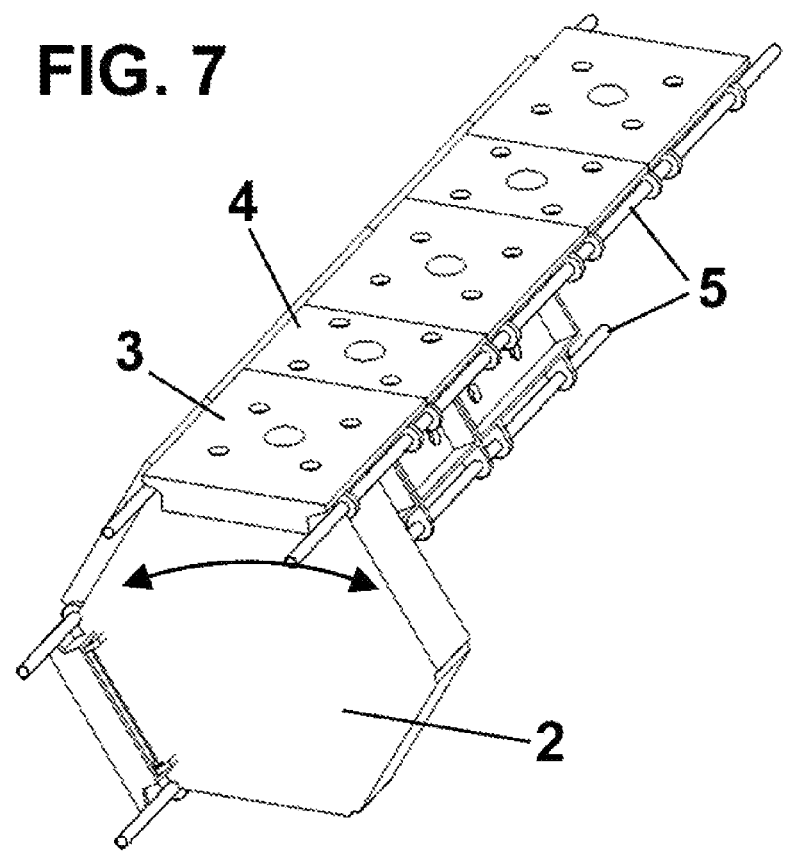
FIG. 7 is a perspective view of one side of the flexible reticular structure according to the present invention, where how the movement of said belt is operated can be seen. The operating or drive pinion is depicted as a 6 tooth pinion, but it is obvious for a person skilled in the art that pinions with a larger number of teeth or several pinions can be used to facilitate and better distribute the drive force.
Figure 8:
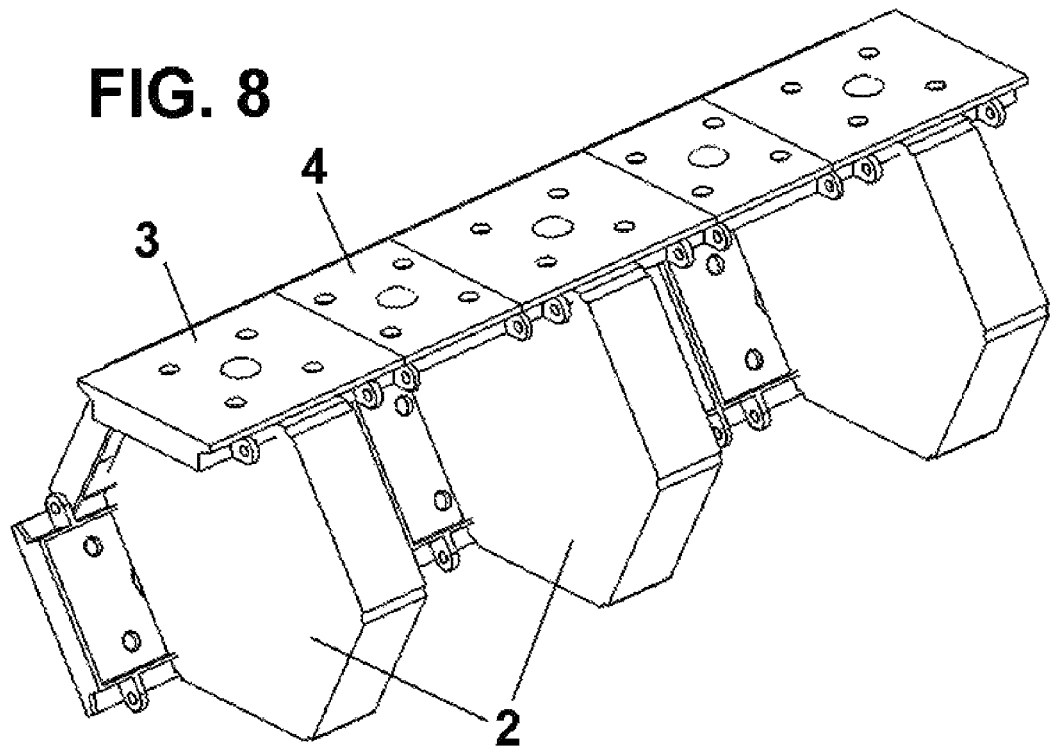
FIG. 8 is a perspective view of one side of the flexible reticular structure according to the present invention, where how it can be operated with several drive pinions as a result of its design can be seen.

Said movable surface 1 is preferably operated by means of a single motor 2, which can be seen in FIG. 7, in both directions.

Furthermore, said surface 1 is modular, i.e., it is formed by a plurality of modules 3, 4. According to the embodiment depicted in the drawings, said modules are of two types, i.e., larger modules 3 and smaller modules 4, which are depicted separately in FIGS. 3 and 4, respectively.

Figure 2:
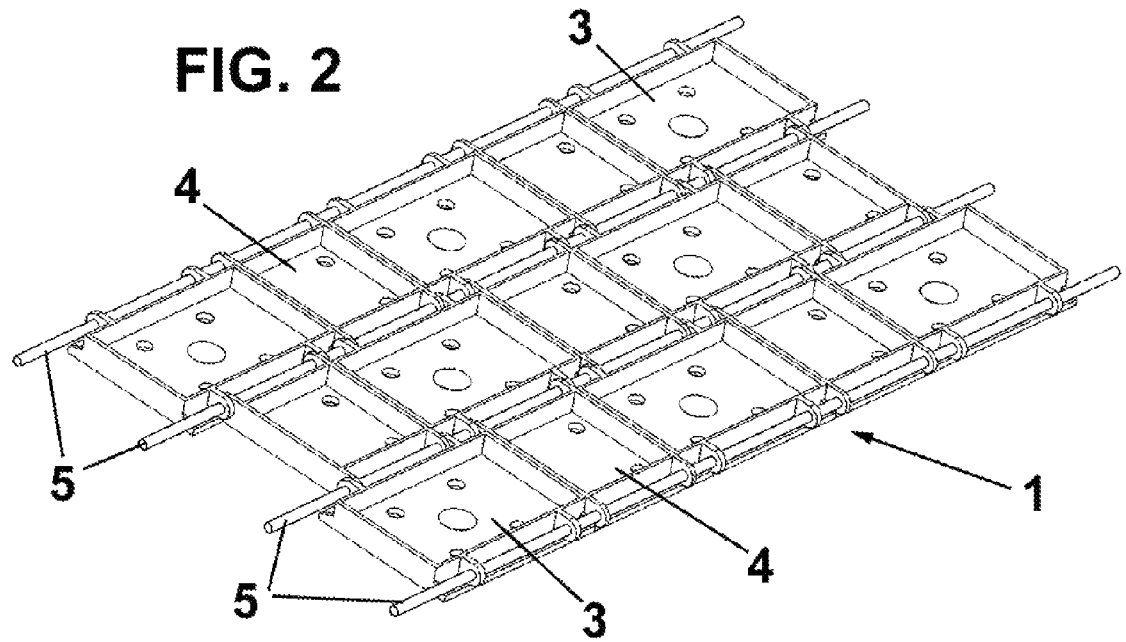
FIG. 2 is a perspective view of the lower part of a portion of a flexible reticular structure according to the present invention.

Said larger modules 3 and smaller modules 4 are arranged both longitudinally and transversely in an alternating manner, as can be seen in FIGS. 1 and 2, such that each larger module 3 will be surrounded by four smaller modules 4, and vice versa.

As indicated by their name, the larger modules 3 have larger dimensions than the smaller modules 4, and according to the embodiment depicted in the drawings, said larger modules 3 have a rectangular base, whereas said smaller modules 4 have a quadrangular base. According to this embodiment, the width of said larger modules 3 is substantially equal to the length of said smaller modules 4, as can be seen in FIGS. 1 and 2.

Although not depicted in the drawings, termination parts with a particular measurement can be arranged on the sides so that the sides are straight.

According to the depicted embodiment, said modules 3 and 4 are attached in rows, three in the case of the embodiment of FIGS. 1 and 2. The attachment or coupling of said modules is done by means of longitudinal rods 5 which are introduced in holes 6 of said modules 3, 4.

Figure 3:
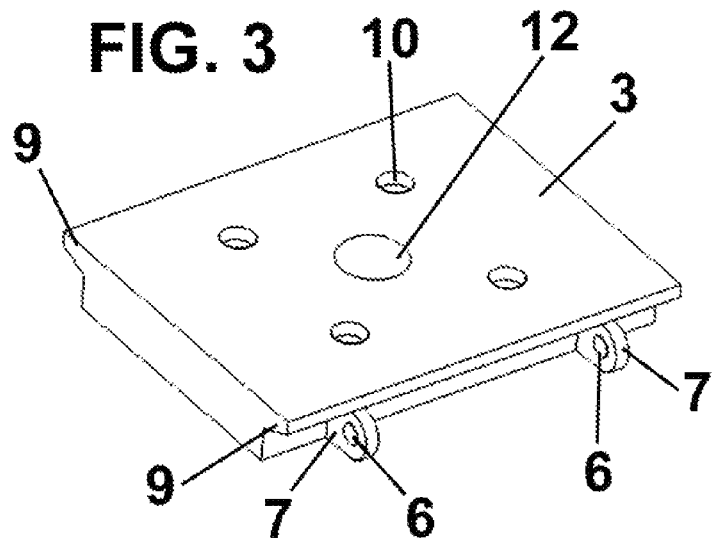
FIG. 3 is a perspective view of the upper part of a larger module.
Figure 4:
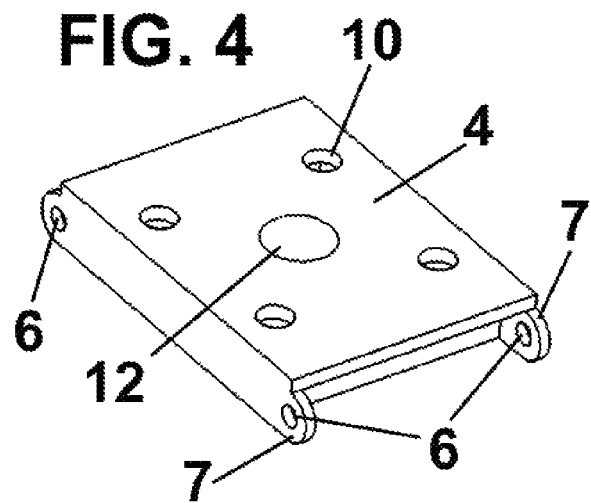
FIG. 4 is a perspective view of the upper part of a smaller module.

As can be better seen in FIGS. 3 and 4, said holes 6 are arranged in flanges 7 of the modules 3, 4, projecting laterally from said modules 3, 4.

Furthermore, for covering the space defined by said rods 5 when attaching the modules 3, 4, said larger modules 3 comprise side projections 9, as shown in FIG. 3, such that the surface 1 will be substantially smooth.

Figure 5:
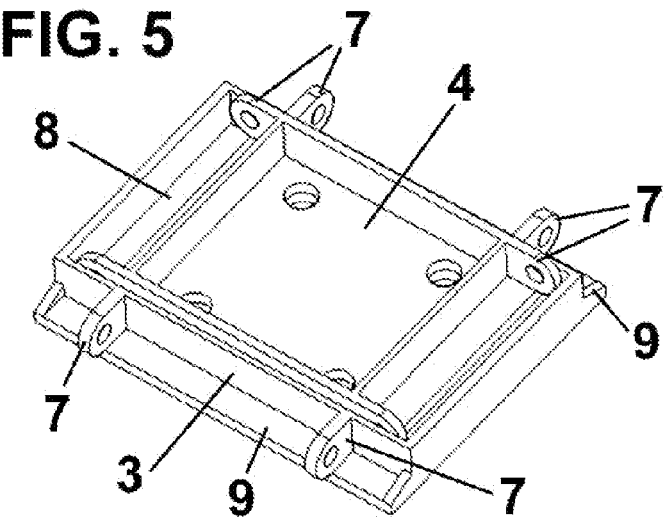
FIG. 5 is a perspective view of the lower part of a smaller module arranged inside the cavity of a larger module.

To facilitate transporting the flexible reticular structure according to the present invention in disassembled position, the larger modules 3 comprise in their lower part a cavity 8 for the housing of a smaller module 4, as can be seen in FIG. 5, such that the smaller modules 4 will not take up additional space during transport.

Additional elements can be arranged on said movable surface 1. To that end, said modules 3, 4 comprise fixing holes 10, although they may comprise any suitable fixing or coupling means (depicted as round holes, these can be any anchoring method: round holes, square holes, clips, guides, etc.).

In this depiction, the brushes include clips 13 on the lower surface fitting with the fixing holes 10.

Figure 6:
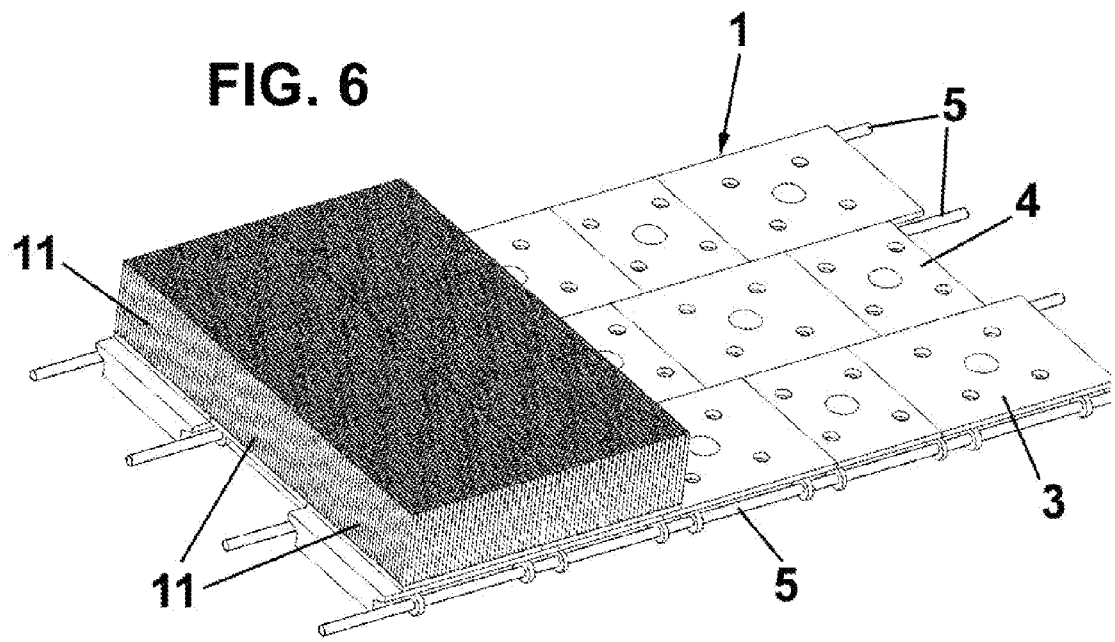
FIG. 6 is a perspective view of the upper part of a portion of a flexible reticular structure according to the present invention, with a plurality of brushes assembled on the movable surface.

According to the embodiment depicted in FIG. 6, said additional elements are brushes 11 that are coupled on said modules 3, 4. In this case, to allow the bristles of the brushes 11 to open when pressing on their lower surface, each module 3, 4 comprises a projection 12 which in the assembled position will press on the lower surface of said brushes 11 so that their bristles open (desired effect in sheet material cutting applications)

These brushes 11 are preferably used serving as a base for a sheet material, such as a piece of paper or fabric, which will be cut by means of a suitable cutting device. The bristles of said brushes 11 will serve as a support for the sheet material, but the blade of the cutting device will be able to pass between them.

As can be seen in this FIG. 6, the sides of the larger modules 3 stick out further with respect to the width of the brushes 11.

Although reference has been made to a specific embodiment of the invention, it is obvious for a person skilled in the art that the flexible reticular structure that has been described is susceptible to a number of variations and modifications, and that all the mentioned details can be replaced with other technically equivalent details, without departing from the scope of protection defined by the attached claims.

The invention claimed is:

1. A flexible reticular structure, comprising a movable surface the movement of which is operated by operating means, characterized in that said surface is formed by a plurality of modules linked to one another by means of attachment rods, each of said rods being housed in holes provided in at least two of said modules, wherein said modules comprise holes for the fixing of respective brushes provided with bristles which are used as a support of a sheet material for the cutting thereof, and wherein said modules comprise one or more projections for opening the bristles of said brushes.

2. The flexible reticular structure according to claim 1, wherein the modules comprise flanges where holes housing said rods are arranged.

3. The flexible reticular structure according to claim 1, wherein said modules are of two different types, larger modules and smaller modules.

4. The flexible reticular structure according to claim 1, wherein said modules have the upper surface perforated.

5. The flexible reticular structure according to claim 3, wherein said larger modules and said smaller modules are longitudinally and transversely arranged in an alternating manner, creating a non-linear framework.

6. The flexible reticular structure according to claim 3, wherein the width of said larger modules is substantially equal to the width of said smaller modules.

7. The flexible reticular structure according to claim 3, wherein the larger modules comprise in their lower part a cavity which can house a smaller module.

8. The flexible reticular structure according to claim 1, wherein said operating means comprise a single motor for moving said surface in both directions.

\* \* \* \* \*